Oct. 7, 1952  L. H. JOHNSTONE ET AL  2,613,175
INHIBITING FORMATION OF SELF-PROPAGATING POLYMERS DURING
DISTILLATION BY USE OF WATER-SOLUBLE NITRITES
Filed Oct. 18, 1948
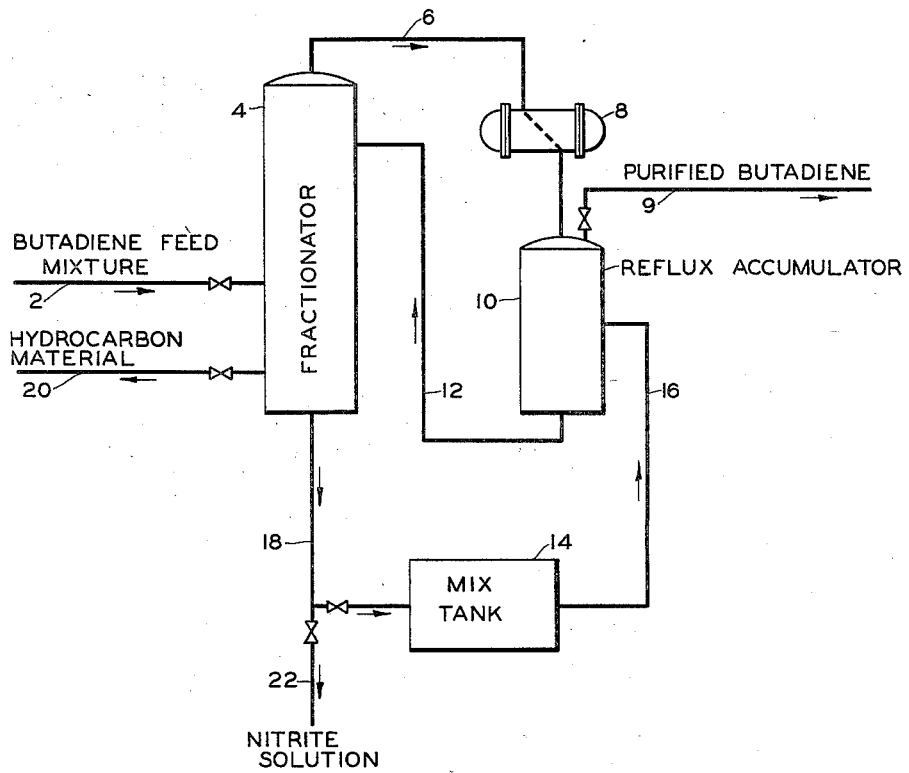
INVENTORS
L. H. JOHNSTONE
L. A. WEBBER
BY  J. J. COSTOLOW
*Hudson and Young*
ATTORNEYS Patented Oct. 7, 1952

2,613,175

UNITED STATES PATENT OFFICE 2,613,175

INHIBITING FORMATION OF SELF-PROPAGATING POLYMERS DURING DISTILLATION BY USE OF WATER-SOLUBLE NITRITES

Leo H. Johnstone, Ludwig A. Webber, and John J. Costolow, Borger, Tex., assignors to Phillips Petroleum Company, a corporation of Delaware Application October 18, 1948, Serial No. 55,192

12 Claims. (Cl. 202—57)

This invention relates to the inhibition of polymerization. In one embodiment it relates to the inhibition of undesirable polymer formation in processing equipment. In one specific embodiment this invention relates to the inhibition of undesirable polymer growth in equipment handling monomeric material, such as butadiene.

It is well known that monomeric materials, such as 1,3-butadiene, styrene, and the like, will polymerize to give a hard porous opaque material, insoluble in ordinary solvents such as benzene or carbon tetrachloride, and has the ability to seed itself or grow when in contact with liquid or gaseous monomeric material, which has been referred to in the art as cauliflower or sponge polymer and, more recently, this type polymer has been referred to as popcorn polymer. The term "popcorn polymer" will be used throughout this specification and claims to mean a self-propagating polymer which has the above mentioned characteristics. Popcorn polymer may be formed by the polymerization of monomeric material in which an olefinic linkage is conjugated with another olefinic linkage as in the conjugated diolefins, such as 1,3-butadiene, or by the polymerization of compounds in which the olefinic linkage is conjugated with some other type of unsaturated linkage, for example, such as the unsaturated linkage in an aromatic ring, as in styrene, or a carbon to oxygen double bond such as in methyl methacrylate. Copolymerization of the above mentioned materials will also produce the popcorn type polymer. The most remarkable property of popcorn polymer is its ability to seed itself or grow when in contact with liquid or gaseous monomeric material.

The manufacture, separation, and purification of butadiene and styrene now form the basis of the synthetic rubber industry. In plants, such as described in U. S. Patent 2,386,310 dated October 9, 1945, which issued to K. H. Hachmuth, wherein butadiene is being recovered, separated, or purified by processes which involve fractional distillation, the growth of popcorn polymer has caused a great deal of trouble. The rapid growth of popcorn polymer not only causes a loss of much valuable material but also plugs fractionators, lines, pumps, condensers and other auxiliary equipment which results in costly shutdowns of the entire plant. Furthermore, the increase in volume, which occurs when liquid or gaseous monomeric material is converted into popcorn polymer, produces excessive pressures, which are sufficient to cause the rupture of steel lines and deformation of fractionators and the like. In one instance, a nine foot diameter fractionating column used for purifying butadiene was removed from service and cleaned. Some small seeds of popcorn polymer were accidentally left on one tray of the column. Within a few months the growth of these few minute seeds was sufficient to entirely plug the 2' x 9' diameter space between the trays of the column, and deformed the beams which supported the uppermost of the two trays. Such a mass of polymer can only be removed by manual means which in effect resemble mining operations. Furthermore, the growth of popcorn polymer has been known to rupture steel lines while they were filled with highly inflammable fluids such as butadiene. The hazards resulting from the growth of popcorn polymer are thus readily apparent.

The growth phenomenon of popcorn polymer has been studied by many investigators. One hypothesis which has been proposed is that popcorn polymer contains a large number of groups which give rise to free radicals. Such a group might be a hydroperoxide, which is formed when oxygen attacks methylene groups adjacent to an olefinic linkage. The greater the number of methylene groups in a polymer, the higher its activity as a popcorn polymer seed. Regardless of the exact reaction mechanism of popcorn polymer growth, the most compelling problem is to provide a means of inhibiting or preventing this growth. On the basis of the above hypothesis of popcorn growth it was assumed by others that an ideal deactivator would be a volatile agent which would destroy the peroxide present in the seed and prevent the formation of additional peroxides. This could be accomplished by a substance which would destroy the double bonds promoting the oxidation resulting in peroxidic groups. The deactivating material might also combine with the seed and thus inhibit reactions of the free radical type. It is known that nitrogen dioxide in dilute mixture with air is absorbed by the popcorn polymer seed which is thus rendered inactive. For effective deactivation with nitrogen dioxide the popcorn polymer seed should be dry and the temperature during the deactivation treatment should be maintained at about 175 to 200° F. Also it is known that a vapor phase treatment employing about 5 to 10 per cent nitrogen dioxide in admixture with nitrogen is effective in deactivating popcorn seed. In a copending application of Boatright et al., Serial No. 775,568, filed September 22, 1947, the use of nitric acid is disclosed as a popcorn polymer deactivating material.

We have discovered a new process for inhibiting the initiation and/or growth of popcorn polymer by use of an aqueous solution of a water-soluble metal nitrite. The process involves passing an aqueous solution of a water-soluble metal nitrite, such as an alkaline earth or alkali metal nitrite, containing a buffer material, such as disodium phosphate, through and in contact with monomeric material distillation system and allied equipment.

It is an object of this invention to provide a method for inhibiting polymerization.

Another object is to inhibit the growth of popcorn polymer.

A further object is to provide a method for deactivating popcorn polymer seed.

A further object is to provide a method for the inhibition of the formation of popcorn polymer material by the polymerization of monomeric materials.

A still further object is to provide a method of inhibiting polymerization of monomeric conjugated diolefins to produce popcorn polymer.

Another object is the inhibition of the polymerization of butadiene to produce popcorn polymer in a butadiene fractionation zone.

Other objects and advantages of this invention will be apparent to one skilled in the art from the accompanying discussion and disclosure.

In the process of our invention the initiation and/or growth of popcorn polymer in a monomeric material distillation zone and allied equipment, including pumps, valves, lines and the like, is inhibited by passing, either continuously or intermittently, an aqueous solution of a water-soluble metal nitrite, such as sodium nitrite, through the distillation zone and allied equipment during the distillation of monomeric material, such as butadiene. The conditions of temperature and pressure under which the nitrite solution is passed through the distillation zone and allied equipment will be those at which distillation or fractionation of the monomeric material are being conducted. These conditions will vary with the different monomeric material being distilled or fractionated, and other factors involved. For example, the conditions employed in the fractionation of butadiene will not be the same as those used when fractionating styrene. The temperature and pressure used, however, are dependent upon one another, for example, when a specific pressure is used in the fractionation or distillation of a specific material the temperature is automatically fixed, and vice versa.

In accordance with one embodiment of this invention the formation and/or growth of popcorn polymer in a monomeric material fractionation zone is inhibited by use of an aqueous solution comprising an alkali metal nitrite, such as sodium nitrite. In a specific embodiment the process of this invention involves the injection of an aqueous solution of sodium nitrite into the upper portion of a butadiene fractionating zone. The nitrite solution may be added, if desired, to the reflux accumulator and passed with the reflux stream to the fractionation zone where it flows downwardly through and in contact with the inner surface of the fractionation zone. The nitrite solution is removed from the base of the fractionation zone and is recycled. The concentration of the nitrite in the aqueous solution may vary from about 1 to about 20 or more per cent by weight of the solution, but usually about a 4 to 10 per cent solution is preferable. The exact percentage employed will depend upon the nitrite used and other factors, such as solubility of the nitrite in water and conditions under which it is used. A solution saturated with a metal nitrite at a temperature of 70 to 80° F. may be advantageously used in some cases.

The quantity of aqueous nitrite solution injected into the upper portion of the monomeric material fractionating zone, such as a butadiene fractionating column, is equivalent to about 0.05 to 3.0 or more per cent by volume of the liquid down-flow in the column but preferably the amount injected is equivalent to 0.1 to 1.0 per cent by volume of the liquid down-flow in the column. The aqueous nitrite solution is removed from the bottom of the fractionating zone and returned to the upper portion directly or with the reflux stream. Test runs have shown that the monomeric material fractionation operation is not impaired by the presence of water.

It is known that certain nitrites, particularly sodium nitrite, in an acid solution react with butadiene to form unstable explosive products. It is possible and likely that certain acids may find their way into monomeric material fractionation systems. This is particularly true in butadiene fractionating systems used in certain butadiene manufacturing plants employing furfural in an extractive distillation process for the recovery of butadiene. Therefore, in one embodiment of this invention it is desirable to maintain the aqueous sodium nitrite solution in an alkaline condition. In order to maintain the sodium nitrite solution in the desired pH range, namely that of 7 to 11, a buffer material, such as disodium phosphate, is added thereto. Any water-soluble buffer, such as disodium phosphate, trisodium phosphate, sodium bicarbonate, sodium borate or the like, which will maintain the pH of the solution in the range of 7 to 11, and preferably in the range of 8 to 9, may be used in carrying out our invention but we prefer to use disodium phosphate. The amount of buffer material used in the nitrite solution is that amount which is sufficient to maintain the solution in the desired pH range. A six per cent by weight aqueous solution of sodium nitrite containing one per cent by weight of disodium phosphate has a pH slightly less than 8.8.

The conditions employed in carrying out the process of our invention are those used in the fractionating zone when separating monomeric material, such as butadiene or styrene, from other impurities. If desirable, the sodium nitrite solution may be circulated through the fractionation system before the introduction of monomeric material in order to get the walls of the equipment coated with a film of the solution before the monomeric material contacts the walls of the equipment. In any event, the sodium nitrite solution is passed through the equipment during the fractionating operation to inhibit the formation or growth of popcorn polymer.

The accompanying drawing schematically illustrates one embodiment of this invention.

Referring to the drawing, a butadiene-containing material is passed from any suitable source to a fractionation zone represented by fractionator 4. Fractionator 4 is maintained at suitable operating conditions for removing substantially pure butadiene as an overhead product. Substantially pure butadiene passes from fractionator 4 through line 6, condenser 8 and into reflux accumulator 10 from which a portion is removed from the system through line 9. A portion of the butadiene from reflux accumulator 10 is returned as reflux to fractionator 4 through line 12. A sodium nitrite solution containing disodium phosphate as an inhibitor is prepared in mix tank 14 by any suitable means, not shown, and the resulting solution is passed through line 16 to reflux accumulator 10. A portion of the sodium nitrite solution is passed along with reflux butadiene through line 12 and the mixture is introduced into the upper portion of fractionator 4. The sodium nitrite solution passes downwardly through fractionator 4 where it contacts the inner surface of the fractionator, thereby inhibiting the formation of popcorn polymer therein or deactivating popcorn polymer seed that may be present. A liquid phase is maintained in the bottom portion of fractionator 4, which is separated into an aqueous phase and a hydrocarbon phase; the lower, or aqueous phase, is removed from the bottom of fractionator 4 through line 18 and is recycled through mix tank 14 and line 16 to reflux accumulator 10 where it passes with the butadiene reflux through line 12 to fractionator 4; the hydrocarbon material boiling above butadiene comprises the upper liquid phase and is withdrawn from fractionator 4 through line 20 for further handling as desired. If desirable, a portion of the aqueous solution may be withdrawn from the system through line 22. Make-up sodium nitrite solution is added to mix tank 14 as needed.

In the accompanying diagrammatic drawing reference to some of the equipment such as pumps, gauges, and other equipment which obviously would be necessary to actually operate the process have been intentionally omitted. Only sufficient equipment has been shown to illustrate the process of the invention and it is intended that no undue limitation be read into this invention by reference to the drawing and discussion thereof.

In some cases it may be necessary or desirable to treat a monomeric material distillation or fractionation zone, which has previously been in operation, with a nitrite solution to deactivate popcorn polymer seed present therein. In such a case, it is desirable to remove, by any suitable means, all major accumulations, if any, of popcorn polymer before treating the system with the nitrite solution. After such treatment the popcorn polymer seed, if any, in the system will be deactivated before distillation of monomeric material is resumed.

There are many advantages of this new method for inhibiting the initiation of popcorn polymer and deactivating popcorn polymer seed. In the first place the sodium nitrite used is readily available and is relatively inexpensive. The nitrite solution is an effective inhibitor at temperatures in the range at which the monomeric material is being fractionated. The popcorn polymer seed need not be dry for inhibition or deactivation with an aqueous sodium nitrite solution, which is a significant advantage in commercial operations. For instance, in preparing a fractional distillation column for any type of popcorn polymer seed deactivation the usual practice is to drain the column of liquid hydrocarbon and then pass steam into the column until it is free of hydrocarbon vapors. In the "steaming out" step a portion of steam is condensed thus wetting the popcorn polymer seed. It has been found that the presence of moisture adversely effects the efficiency of nitrogen dioxide, for example, as a deactivating agent, but obviously such is not the case with aqueous nitrite solution. A very important advantage of the process of this invention is that it is not necessary to shut down a plant in order to deactivate popcorn polymer seed. The nitrite solution is pumped into the fractionation zone during regular operation.

The invention disclosed herein provides a simple and inexpensive method for inhibiting the polymerization of, and preventing the popping and growth of, popcorn polymer seed in a fluid atmosphere comprising one or more compounds in which an olefinic linkage is conjugated with another similar olefinic linkage such as in the conjugated diolefins or compounds in which the olefinic linkage is conjugated with some other type of unsaturated linkage such as an unsaturated linkage in an aromatic ring, or the carbon to oxygen linkage such as is present in methyl methacrylate.

The following example demonstrates some of the advantages of the invention but it is not to be construed as limiting the invention.

EXAMPLE

To determine whether sodium nitrite is effective for the inhibition of popcorn polymer growth at a higher pH, a six per cent sodium nitrite solution was buffered to the desired pH by using disodium and trisodium phosphate, and the buffered solution added to glass ampoules containing 0.2 gram of popcorn polymer seed and ten milliliters of styrene. The volume added was calculated to contain sodium nitrite equal to ten per cent of the polymer seed weight. The ampoules were cooled in a Dry Ice-isooctane bath, sealed, and incubated at 75° C. The data in Table 1 below show that although the control samples had completely popped after 40 hours of incubation, none of the buffered samples containing sodium nitrite had begun to grow after 230 hours.

TABLE 1

*Effect of sodium nitrite on popcorn polymer growth at controlled pH*

| pH of test | Polymer Growth in inches for number of hours of incubation | | | | | Buffer |
|---|---|---|---|---|---|---|
| | 0 | 12 | 40 | 100 | 230 | |
| 7 | 3/8 | 3/8 | 3/8 | 3/8 | 3/8 | Na$_2$HPO$_4$. |
| 7.5 | 3/8 | 3/8 | 3/8 | 3/8 | 3/8 | Na$_2$HPO$_4$. |
| 8.0 | 3/8 | 3/8 | 3/8 | 3/8 | 3/8 | Na$_2$HPO$_4$. |
| 8.5 | 3/8 | 3/8 | 3/8 | 3/8 | 3/8 | Na$_2$HPO$_4$. |
| 10.8 | 3/8 | 3/8 | 3/8 | 3/8 | 3/8 | Na$_3$PO$_4$. |
| Control | 3/8 | 2 | 4½ | 4½ | 4½ | None. |

It is to be understood that this invention should not be unnecessarily limited to the above discussion and description and that modifications and variations may be made without departing substantially from the invention or from the scope of the claims.

We claim:

1. A continuous process for inhibiting the formation of benzene insoluble self-propagating polymer in a butadiene fractionation zone in which butadiene is being fractionated, which comprises introducing an aqueous solution containing 1 to 20 weight per cent of sodium nitrite and sufficient amount of a water-soluble buffer material to maintain the pH of said aqueous solution in the range of from 7 to 11 into a reflux accumulator zone associated with said butadiene fractionation zone, passing said aqueous solution along with reflux butadiene into the upper portion of said butadiene fractionation zone during the butadiene fractionation operation, allowing said aqueous solution to flow downwardly through said fractionation zone, separating said aqueous solution as an aqueous phase in the bottom portion of said fractionation zone, and recycling said aqueous phase to said reflux accumulator zone.

2. A continuous process for inhibiting the formation of benzene insoluble self-propagating polymer in a butadiene fractionation zone in which butadiene is being fractionated, which comprises introducing an aqueous solution containing 4 to 10 weight per cent of sodium nitrite and sufficient amount of a water-soluble buffer material to maintain the pH of said aqueous solution in the range of from 8 to 9 into an upper portion of said butadiene fractionation zone during the butadiene fractionation operation, allowing said aqueous solution to flow downwardly through said butadiene fractionation zone, removing said aqueous solution from the bottom portion of said fractionation zone, and recycling said aqueous solution to an upper portion of said fractionation zone.

3. A continuous process for inhibiting the formation of benzene insoluble self-propagating polymer in a butadiene fractionation zone in which butadiene is being fractionated, which comprises introducing an aqueous solution containing sodium nitrite in the amount of from 1 per cent by weight up to and including that amount necessary to produce a saturated solution at 70 to 80° F., said solution also containing sufficient amount of a water-soluble buffer material to maintain the pH of said aqueous solution in the range of from 7 to 11 into an upper portion of said butadiene fractionation zone during the butadiene fractionation operation, allowing said aqueous solution to flow downwardly through said butadiene fractionation zone, removing said aqueous solution from the bottom portion of said fractionation zone, and recycling said aqueous solution to an upper portion of said fractionation zone.

4. A continuous process for inhibiting the formation of benzene insoluble self-propagating polymer in a butadiene fractionation zone in which a butadiene is being fractionated, which comprises introducing an aqueous solution containing 1 to 20 weight per cent of sodium nitrite into an upper portion of said butadiene fractionation zone and maintaining said aqueous solution in the fractionation zone during the butadiene fractionation operation, allowing said aqueous solution to flow downwardly through said fractionation zone, and removing said aqueous solution from the bottom portion of said fractionation zone.

5. A continuous process for inhibiting the formation of insoluble self-propagating polymer in a butadiene fractionation zone in which said butadiene is being fractionated, which comprises continuously introducing an aqueous solution containing 1 to 20 weight per cent of a metal nitrite selected from the group consisting of alkali metal and alkaline earth metal nitrites into an upper portion of said butadiene fractionation zone during the butadiene fractionation operation, allowing said aqueous solution to flow downwardly through said fractionation zone, and removing said aqueous solution from the bottom portion of said fractionation zone.

6. A continuous process for inhibiting the formation of benzene insoluble self-propagating polymer in a butadiene fractionation zone in which butadiene is being fractionated, which comprises introducing an aqueous solution containing 1 to 20 weight per cent of an alkali metal nitrite and sufficient amount of a water-soluble buffer material to maintain the pH of said aqueous solution in the range of from 7 to 11 into an upper portion of said butadiene fractionation zone during the butadiene fractionation operation, allowing said aqueous solution to flow downwardly through said fractionation zone, removing said aqueous solution from the bottom portion of said fractionation zone, and recycling said aqueous solution to an upper portion of said fractionation zone.

7. A continuous process for inhibiting the formation of benzene insoluble self-propagating polymer in a butadiene fractionation zone in which butadiene is being fractionated, which comprises introducing an aqueous solution containing 1 to 20 weight per cent of an alkali metal nitrite and sufficient amount of a water-soluble buffer material to maintain the pH of said aqueous solution in the range of from 7 to 11 into an upper portion of said butadiene fractionation zone during the butadiene fractionation operation, allowing said aqueous solution to flow downwardly through said fractionation zone, maintaining a body of liquid in the lower portion of said fractionation zone, allowing said body of liquid to separate by gravity into a lower aqueous phase and an upper non-aqueous phase, and recycling said aqueous phase to an upper portion of said fractionation zone.

8. The process of claim 7 wherein said alkali metal nitrite is sodium nitrite.

9. The process of claim 7 wherein said alkali metal nitrite is potassium nitrite.

10. The process of claim 7 wherein said alkali metal nitrite is lithium nitrite.

11. A process for inhibiting the formation of insoluble self-propagating polymer in a butadiene fractionation zone in which butadiene is being fractionated, which comprises introducing an aqueous solution containing 1 to 20 weight per cent of a water-soluble metal nitrite into an upper portion of said butadiene fractionation zone during the butadiene fractionation operation, allowing said aqueous metal nitrite solution to flow downwardly through said fractionation zone, maintaining a body of liquid in the lower portion of said fractionation zone, allowing said body of liquid to separate by gravity into a lower aqueous phase and an upper non-aqueous phase, and recycling said aqueous phase to an upper portion of said fractionation zone.

12. A process for inhibiting the formation of insoluble self-propagating polymer in a butadiene fractionation zone in which butadiene is being fractionated, which comprises introducing an aqueous solution containing a water-soluble metal nitrite in the amount from 1 per cent by weight up to and including that amount of said metal nitrite necessary to produce a saturated solution at 70 to 80° F. into an upper portion of said monomeric material fractionation zone during the butadiene fractionation operation, allowing said aqueous metal nitrite solution to flow downwardly through said fractionation zone, maintaining a body of liquid in the lower portion of said fractionation zone, allowing said body of liquid to separate by gravity into a lower aqueous phase and an upper non-aqueous phase, and recycling said aqueous phase to an upper portion of said fractionation zone.

LEO H. JOHNSTONE.
LUDWIG A. WEBBER.
JOHN J. COSTOLOW.

REFERENCES CITED

The following references are of record in the file of this patent:

UNITED STATES PATENTS

| Number | Name | Date |
| --- | --- | --- |
| 2,171,795 | Kautter | Sept. 5, 1939 |
| 2,240,764 | Dreisbach et al. | May 6, 1941 |

OTHER REFERENCES

Kharasch et al., "Inhibition of Polymerization," Industrial and Engineering Chemistry, vol. 39, pp. 830–837 (July 1947).